(12) United States Patent
Kano et al.

(10) Patent No.: US 6,193,898 B1
(45) Date of Patent: Feb. 27, 2001

(54) METHOD AND APPARATUS FOR FABRICATING REFLECTOR

(75) Inventors: Mitsuru Kano, Fukushima-ken; Tomomasa Takatsuka, Miyagi-ken; Kenji Omote, Fukushima-ken, all of (JP)

(73) Assignee: Alps Electric Co., Ltd. (JP)

( * ) Notice: Subject to any disclaimer, the term of this patent is extended or adjusted under 35 U.S.C. 154(b) by 0 days.

(21) Appl. No.: 09/170,715

(22) Filed: Oct. 13, 1998

(30) Foreign Application Priority Data

Oct. 14, 1997 (JP) .................................................. 9-280229

(51) Int. Cl.[7] .................................................. G02F 1/1333
(52) U.S. Cl. .................................. 216/23; 216/24; 216/49; 216/53; 216/87; 264/1.36; 264/1.9; 264/2.6; 430/321
(58) Field of Search ........................... 216/23, 34, 49, 216/52, 53, 87; 264/1.31, 1.36, 1.38, 1.6, 1.9, 2.6; 430/321

(56) References Cited

U.S. PATENT DOCUMENTS

| | | | |
|---|---|---|---|
| 4,642,163 | * | 2/1987 | Greschner et al. ..................... 216/13 |
| 4,781,790 | * | 11/1988 | Wu ........................................ 216/24 |
| 4,788,015 | * | 11/1988 | Sakai et al. ............................ 264/1.3 |
| 4,933,120 | * | 6/1990 | D'Amato et al. ....................... 264/13 |
| 5,124,089 | * | 6/1992 | Ohkoshi et al. ....................... 264/1.4 |
| 5,200,120 | * | 4/1993 | Sakai ..................................... 264/1.3 |
| 5,279,689 | * | 1/1994 | Shvartsman ........................... 156/220 |
| 5,330,880 | * | 7/1994 | Horigome et al. .................... 430/321 |
| 5,772,905 | * | 6/1998 | Chou ...................................... 216/44 |

FOREIGN PATENT DOCUMENTS 7-198919    8/1995  (JP) .

\* cited by examiner

*Primary Examiner*—Anita Alanko
(74) *Attorney, Agent, or Firm*—Brinks Hofer Gilson & Lione

(57) ABSTRACT

A plurality of reflectors respectively having the same rough reflecting surfaces are formed substantially simultaneously on a transparent substrate of a large area. A photosensitive resin film is formed on a surface of a transparent substrate. An embossing die having a rough working surface is pressed against a photosensitive resin part of the photosensitive resin film and the photosensitive resin part is irradiated with ultraviolet rays from below the transparent substrate to form a prehardened photosensitive resin part. Those steps are repeated to form a plurality of prehardened, embossed photosensitive resin parts on the transparent substrate, and then parts not prehardened of the photosensitive resin film are removed by etching. The prehardened, embossed photosensitive resin parts are heated for hardening, and a metal reflecting film is formed on the hardened embossed photosensitive resin parts to complete a plurality of reflectors.

1 Claim, 3 Drawing Sheets ion to the present invention has a
METHOD AND APPARATUS FOR FABRICATING REFLECTOR

BACKGROUND OF THE INVENTION

1. Field of the Invention

The present invention relates to a method of fabricating a reflector for use on a reflective liquid crystal display, having a roughened reflecting surface, and a reflector fabricating apparatus for fabricating such a reflector.

2. Description of the Related Art

A conventional method of fabricating a reflector having a roughened reflecting surface roughens a surface of a glass plate or a surface of a synthetic resin film formed on a glass plate by blowing glass particles against the surface, and forms a metal reflecting film, such as an aluminum film, on the roughened surface. Another conventional method of fabricating such a reflector etches a surface of a glass plate with hydrofluoric acid to form a roughened surface and forms a metal reflecting film of aluminum or the like on the roughened surface.

These conventional methods, however, have difficulty in fabricating a plurality of reflectors under the same reflector fabricating conditions, and hence the different reflectors fabricated by those methods have reflecting surfaces of different irregularities, respectively. Accordingly, it has been difficult to mass-produce reflectors having reflection characteristics within permissible range of variation by those conventional methods.

SUMMARY OF THE INVENTION

The present invention has been made in view of those problems in the conventional reflector fabricating methods and it is therefore an object of the present invention to provide a reflector fabricating method capable of easily and simply fabricating reflectors having the same reflection characteristics by a mass production system, and a reflector fabricating apparatus for carrying out the same reflector fabricating method.

According to a first aspect of the present invention, a reflector fabricating method comprises the steps of: coating a surface of a transparent substrate with a photosensitive resin film; pressing a rough working surface of an embossing die against a part of the soft photosensitive resin film to form an embossed photosensitive resin part and, at the same time irradiating the embossed photosensitive resin part of the photosensitive resin film from behind a back surface of the transparent substrate for prehardening; removing the embossing die from the prehardened, embossed photosensitive resin part having a desired embossed surface of the photosensitive resin film; repeating those steps to form a plurality of prehardened, embossed photosensitive resin parts in the photosensitive resin film; removing parts of the photosensitive resin film excluding the prehardened, embossed photosensitive resin parts of the same by etching; heating the prehardened, embossed photosensitive resin parts of the photosensitive resin film for hardening; and forming a metal reflecting film over the hardened, embossed photosensitive resin parts of the photosensitive resin film.

Thus, a plurality of reflectors having the same rough surfaces can simultaneously be fabricated on a transparent substrate having a large area in a satisfactory reproducibility. Thus, reflectors not significantly differing from each other in reflection characteristic can easily and simply be mass-produced.

According to a second aspect of the present invention, a reflector fabricating apparatus comprises: a movable embossing die having a rough working surface and capable of being vertically moved; a base provided with a transparent window having a shape substantially corresponding to the external shape of the rough working surface of the embossing die, and disposed opposite to the rough working surface of the embossing die; a substrate carrying device capable of supporting a transparent substrate having a surface coated with a photosensitive resin film and of horizontally moving in a space between the embossing die and the base; and a light source for projecting light rays toward the embossing die through the transparent window of the base.

The reflector fabricating apparatus moves the movable embossing die, the base and the substrate carrying device in horizontal directions relative to each other to form prehardened, embossed photosensitive resin parts successively, and fabricates a plurality of reflectors simultaneously using a transparent substrate having a large area. Thus, the reflector fabricating apparatus is capable of easily and simply mass-producing reflectors.

In a third aspect of the present invention, a reflector fabricating apparatus comprises: a movable embossing die having a rough working surface and capable of being vertically moved; a base for supporting a transparent substrate having a surface coated with a photosensitive resin film, provided with a plurality of transparent windows of a shape substantially corresponding to the external shape of the rough working surface of the embossing die and arranged at intervals, and capable of horizontally moving relative to the embossing die; and a light source for projecting light rays toward the embossing die through the transparent windows of the base.

Thus, the reflector fabricating apparatus is capable of simultaneously, easily and simply mass-producing reflectors.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
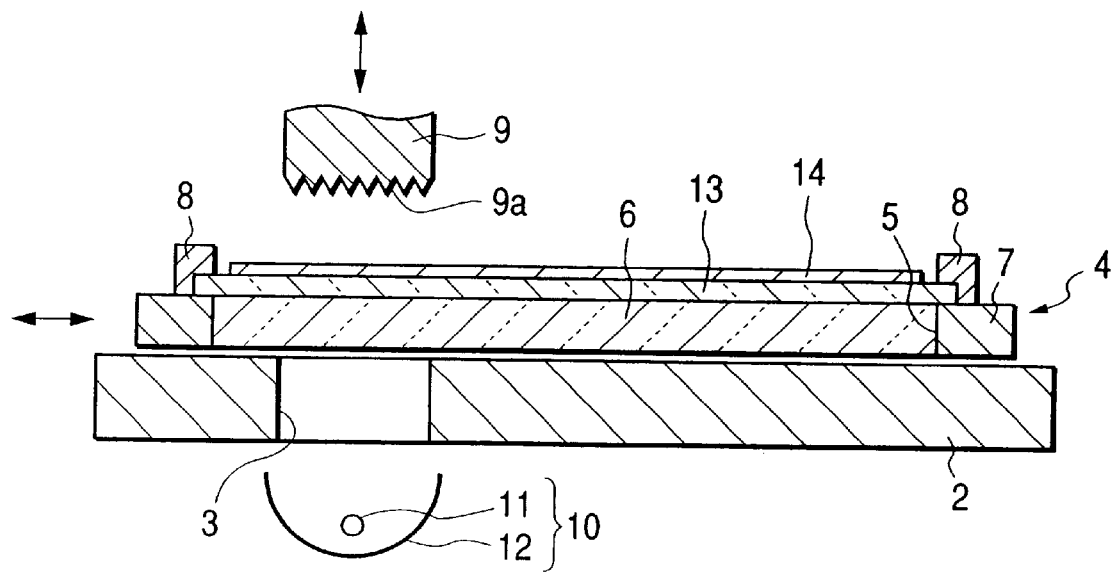
FIG. 1 is a sectional view of a reflector fabricating apparatus in a first embodiment according to the present invention.

Referring to FIG. 1, a reflector fabricating apparatus in a first embodiment according to the present invention has a flat base 2 having the shape of a flat plate and provided in a part thereof with a rectangular transparent window 3. A substrate carrying device 4 for carrying and supporting a transparent substrate 13 is disposed above the transparent window 3 so as to be horizontally movable. The substrate carrying device 4 has an opening 5 penetrating a direction of a thickness, and a transparent support member 6 is fitted in the opening 5 to support the transparent substrate 13. A substrate holding member 8 for holding the transparent substrate 13 on the substrate carrying device 4 is fastened detachably with a screw or the like to the frame 7. The substrate carrying device 4 is moved horizontally by a cylinder actuator, not shown, or the like.

A movable embossing die 9 having a rough working surface 9a is held above the substrate carrying device 4 with the rough working surface 9a facing the transparent window 3 so as to be vertically movable. A light source 10 capable of emitting ultraviolet rays or the like is disposed below the base 2 opposite to the transparent window 3 of the base 2. The transparent window 3 may be either a hollow opening or an opening paned with a transparent member. The transparent window 3 has a shape of dimensions not greater than the corresponding dimensions of the rough working surface 9a of the embossing die 9.

The substrate carrying device 4 is disposed above the base 2 with the least possible space between the upper surface of the base 2 and the lower surface of the substrate carrying device 4 to prevent the reduction of the intensity of light emitted by the light source 10 toward the rough working surface 9a by diffraction in the space between the upper surface of the base 2 and the lower surface of the substrate carrying device 4. The light source 10 has an ultraviolet lamp 11 which emits ultraviolet rays, and a reflecting mirror 12. The ultraviolet lamp 11 and the reflecting mirror 12 are disposed so that ultraviolet rays emitted by the ultraviolet lamp 11 and reflected by the reflecting mirror 12 travel substantially in parallel to each other.

The embossing die 9 having the rough working surface 9a is formed by forming irregularities in a surface of a brass plate by machining. The support member 6 must have a strength sufficient to bear a pressure applied thereto by the embossing die 9 when pressing the rough working surface 9a against a photosensitive resin film 14 formed on the transparent substrate 13 for embossing. Therefore the support member 6 must be a relatively thick glass plate or the like. Since glass absorbs ultraviolet rays and a thicker glass plate absorbs greater amount of ultraviolet rays, it is desirable to use a transparent quartz plate having a relatively low absorptive power to ultraviolet rays. For example, it is preferable to use a quartz plate of a thickness on the order of 50 mm. The frame 7 of the substrate carrying device 4 must be made of a highly rigid material, such as a steel or a ceramic material. The substrate carrying device 4 may be a single member of a transparent material, such as quartz.

The movable embossing die 9 may be provided with a camera capable of reading a positioning mark formed on the transparent substrate 13. A rotary shutter may be placed between the base 2 and the light source 10 along the back surface of the base 2 to control exposure time for which the photosensitive resin film 14 is exposed to ultraviolet rays.

A reflector fabricating method using the foregoing reflector fabricating apparatus shown in FIG. 1 will be described with reference to FIGS. 3A to 3E.

A liquid photosensitive resin is spread in a photosensitive resin film of a predetermined thickness over a surface of the transparent substrate 13 of glass or the like by a spin coating method. The photosensitive resin film is heated for prehardening at temperatures in a predetermined temperature range by a heating device, such as a heating furnace to form a soft photosensitive resin film 14. The photosensitive resin may be a photosensitive acrylic resin, a photosensitive polystyrene resin, a photosensitive azide resin or a photosensitive imide resin. Although dependent on the photosensitive resin forming the film, desirable prehardening temperature is in the range of 40 to 150° C. If the prehardening temperature is below 40° C., a solvent will remain in the photosensitive resin film 14 and may possibly form bubbles in the interface between the rough working surface 9a of the embossing die 9 and a photosensitive resin part 16 when the photosensitive resin film 14 is exposed to ultraviolet rays in the subsequent process. If the prehardening temperature is higher than 150° C., the fluidity of the photosensitive resin may be reduced excessively and the pattern of the rough working surface 9a of the embossing die 9 cannot satisfactorily transferred to the surface of the prehardened photosensitive resin film 14.

The transparent substrate 13 coated with the photosensitive resin film 14 is mounted on the substrate carrying device 4 and is held fixedly on the substrate carrying device 4 with the holding member 8, and the substrate carrying device 4 is positioned at a predetermined position relative to the movable embossing die 9 as shown in FIG. 1.

Figure 3A:
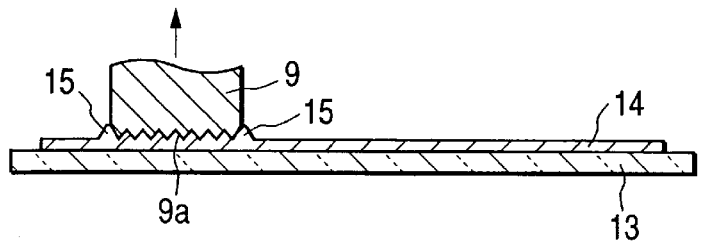
FIGS. 3A, 3B, 3C, 3D and 3E are sectional views of assistance in explaining steps of a reflector fabricating method in accordance with the present invention to be carried out by the reflector fabricating apparatus of FIG. 1 or 2.

In this state, the rough working surface 9a of the movable embossing die 9 is pressed against the photosensitive resin film 14 formed on the transparent substrate 13 by a predetermined pressure as shown in FIG. 3A, and ultraviolet rays are emitted toward the rough working surface 9a from below the transparent substrate 13 by the light source 10. Since the transparent window 3 is formed in dimensions not greater than those of the rough working surface 9a, a photosensitive resin protrusion 15 around the rough working surface 9a is not irradiated with ultraviolet rays and hence only an embossed photosensitive resin part 16 can be irradiated with ultraviolet rays for prehardening.

Figure 3B:
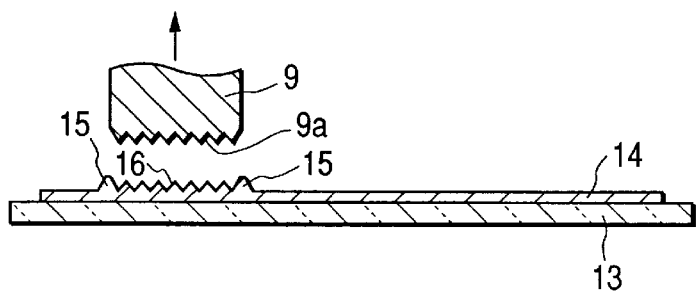

Then, as shown in FIG. 3B, the movable embossing die 9 is separated from the prehardened photosensitive resin part 16. Thus, the negative pattern of the rough working surface 9a is embossed in the surface of the prehardened photosensitive resin part 16.

Figure 3C:
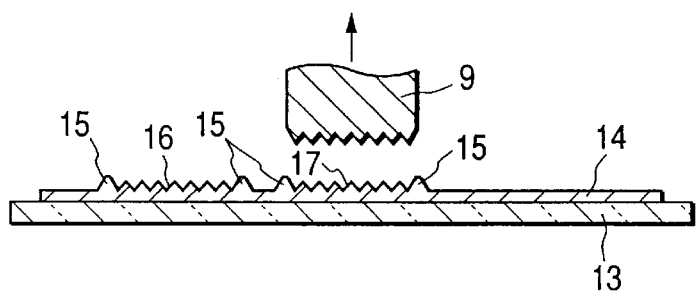
Figure 3D:
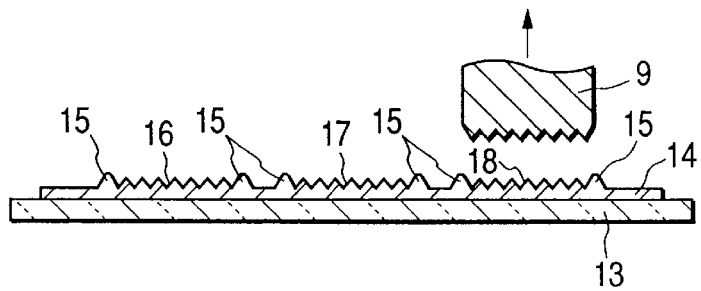

Subsequently, the substrate carrying device 4 is moved to position the movable embossing die 9 to a desired part of the photosensitive resin film 14 where the rough working surface 9a is not embossed, the rough working surface 9a of the movable embossing die 9 is pressed against the desired part of the photosensitive resin film 14 to form an embossed photosensitive resin part 17, ultraviolet rays are emitted toward the rough working surface 9a from below the transparent substrate 13 by the light source 10 to preharden the embossed photosensitive resin part 17, and then the embossing die 9 is separated from the prehardened, embossed photosensitive resin part 17 as shown in FIG. 3C. The same procedure is repeated to form a prehardened, embossed photosensitive resin part 18 as shown in FIG. 3D.

The transparent substrate 13 carrying the prehardened, embossed photosensitive resin parts 16, 17 and 18 is immersed in an etchant to remove parts of the photosensitive resin film 14 other than the prehardened, embossed photosensitive resin parts 16, 17 and 18 by etching, the prehardened, embossed photosensitive resin parts 16, 17 and 18 are heated at a temperature of 240° C. or above for hardening to finish the hardened photosensitive resin parts 16, 17 and 18.

Figure 4:
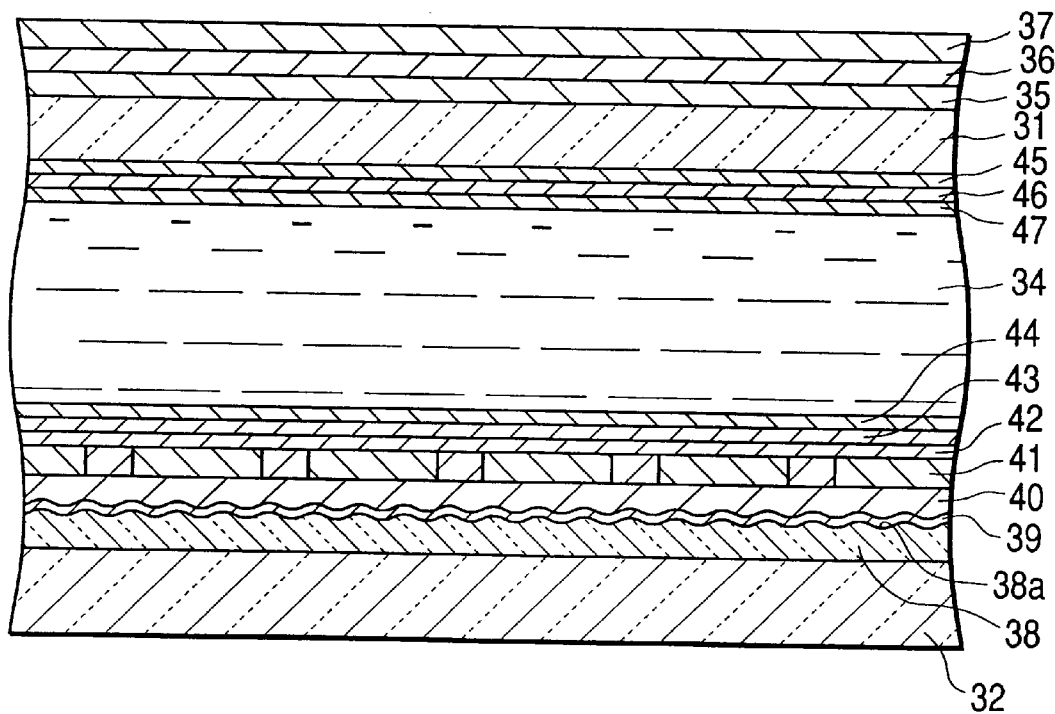
FIG. 4 is sectional view of a reflective liquid crystal display employing a reflector fabricated by the reflector fabricating method illustrated in FIGS. 3A to 3E.

A metal reflecting film is formed over the surfaces of the hardened photosensitive resin parts 16, 17 and 18 by sputtering or the like to form a plurality of reflectors on the transparent substrate 13. The transparent substrate 13 is cut into the plurality of individual reflectors. The component layers of liquid crystal displays, which will be described later, may be formed on the plurality of reflectors to build the liquid crystal displays on the transparent substrate 13 before cutting the transparent substrate 13 into the individual reflectors, and then the transparent substrate 13 may be cut into the plurality of liquid crystal displays as shown in FIG. 4.

The metal reflecting film may be formed by a CVD (chemical vapor deposition), ion plating, or electroless plating instead of by sputtering. The metal reflecting film may be of Al, an Al alloy, Ag or an Ag alloy.

Figure 2:
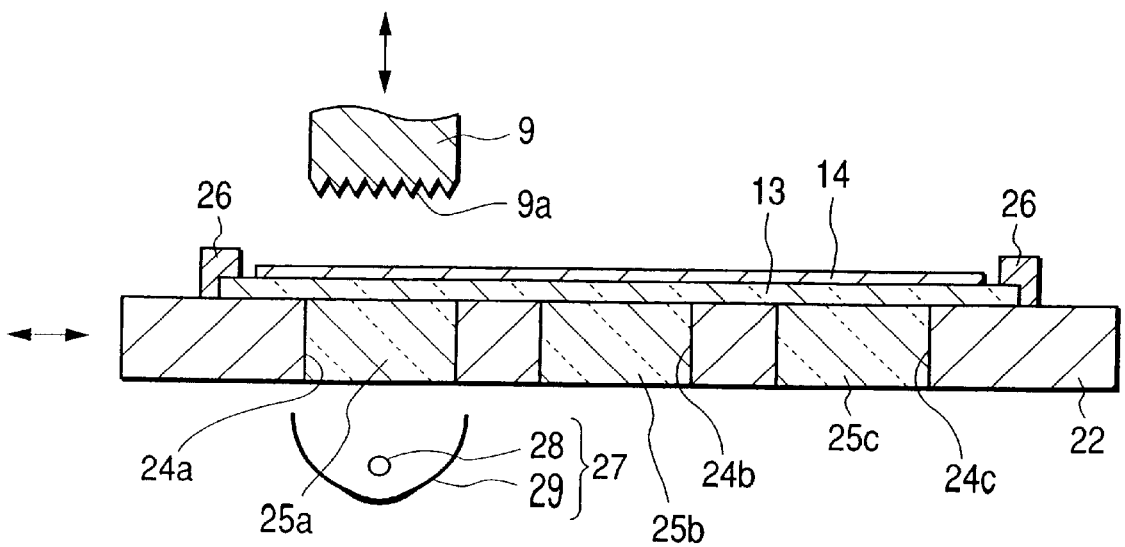
FIG. 2 is a sectional view of a reflector fabricating apparatus in a second embodiment according to the present invention.

A reflector fabricating apparatus in a second embodiment according to the present invention will be described with reference to FIG. 2. Referring to FIG. 2, the reflector fabricating apparatus has a flat base 22 having the shape of a flat plate and provided in parts thereof with rectangular transparent windows 24a, 24b and 24c respectively paned with transparent members 25a, 25b and 25c, and a movable embossing die 9 similar to that shown in FIG. 1 and capable of being vertically moved relative to the base 22. The base 22 can horizontally be moved relative to the embossing die 9 by a cylinder actuator, not shown, and the embossing die 9 is not horizontally movable. The embossing die 9 may horizontally be moved relative to the base 22, and the base 22 may be horizontally immovable. A substrate holding member 26 for holding a transparent substrate 13 on the base 22 is fastened detachably with a screw or the like to the base 22. The transparent windows 24a, 24b and 24c have a shape of dimensions not greater than the corresponding dimensions of the rough working surface 9a of the embossing die 9. The movable embossing die 9 having the rough working surface 9a is held above the base 22 with the rough working surface 9a facing the base 22 so as to be vertically movable. A light source 27 capable of emitting ultraviolet rays or the like is disposed below the base 22. The light source 27 has an ultraviolet lamp 28 which emits ultraviolet rays, and a reflecting mirror 29.

The transparent members 25a, 25b and 25c must have a strength sufficient to bear a pressure applied thereto by the embossing die 9 when pressing the rough working surface 9a against a photosensitive resin film 14 formed on the transparent substrate 13 for embossing. Therefore the transparent members 25a, 25b and 25c must be relatively thick glass plate or the like. Since glass absorbs ultraviolet rays and a thicker glass plate absorbs greater amount of ultraviolet rays, it is desirable to use transparent quartz plates having a relatively low absorptive power to ultraviolet rays. For example, it is preferable to use quartz plates of a thickness on the order of 50 mm. The base 22 must be made of a highly rigid material, such as a steel or a ceramic material.

The base 22 of the reflector fabricating apparatus shown in FIG. 2 has the functions of both the base 2 and the substrate carrying device 4 of the reflector fabricating apparatus shown in FIG. 1, and is simpler in construction than the reflector fabricating apparatus shown in FIG. 1.

Another reflector fabricating method in accordance with the present invention using the reflector fabricating apparatus shown in FIG. 2 will be described with reference to FIGS. 2 and 3A to 3E.

A transparent substrate 13 coated with a soft photosensitive resin film 14 is mounted on the base 22 and is held fixedly on the base 22 with the holding member 26, and the base 22 is positioned at a predetermined position relative to the movable embossing die 9. In this state, the rough working surface 9a of the movable embossing die 9 is pressed against the photosensitive resin film 14 formed on the transparent substrate 13 by a predetermined pressure as shown in FIG. 3A, and ultraviolet rays are emitted toward the rough working surface 9a from below the transparent substrate 13 by the light source 27 to preharden an embossed photosensitive resin part. Then, as shown in FIG. 3B, the movable embossing die 9 is separated from the prehardened photosensitive resin part 16.

Subsequently, the base 22 is moved to position the movable embossing die 9 to a desired part of the photosensitive resin film 14 where the rough working surface 9a is not embossed, the rough working surface 9a of the movable embossing die 9 is pressed against the desired part of the photosensitive resin film 14 to form an embossed photosensitive resin part 17, ultraviolet rays are emitted toward the rough working surface 9a from below the transparent substrate 13 by the light source 27 to preharden the embossed photosensitive resin part 17, and then the embossing die 9 is separated from the prehardened, embossed photosensitive resin part 17 as shown in FIG. 3C. The same procedure is repeated to form a prehardened, embossed photosensitive resin part 18 as shown in FIG. 3D.

Figure 3E:

Then, the transparent substrate 13 carrying the prehardened embossed photosensitive parts 16, 17 and 18 is processed by the same process as that used by the previously described reflector fabricating method using the reflector fabricating apparatus of FIG. 1. The transparent substrate 13 carrying the prehardened, embossed photosensitive resin parts 16, 17 and 18 is immersed in an etchant to remove parts of the photosensitive resin film 14 other than the prehardened, embossed photosensitive resin parts 16, 17 and 18 by etching, the prehardened, embossed photosensitive resin parts 16, 17 and 18 are heated by a heating device at a temperature of 240° C. or above for hardening to finish the hardened photosensitive resin parts 16, 17 and 18 as shown in FIG. 3E.

A metal reflecting film is formed over the surfaces of the hardened photosensitive resin parts 16, 17 and 18 by sputtering or the like to form a plurality of reflectors on the transparent substrate 13.

FIG. 4 shows a reflective liquid crystal display provided with the reflector fabricated by the reflector fabricating method of the present invention. In this reflective liquid crystal display, a liquid crystal layer 34 is sandwiched between an upper glass substrate 31 and a lower glass substrate 32, and two phase plates 35 and 36 and a sheet polarizer 37 are superposed in that order on the outer surface of the upper glass substrate 31. A liquid crystal forming the liquid crystal layer 34 is of a STN type. A reflector is fabricated by the reflector fabricating method using the reflector fabricating apparatus shown in FIG. 2 by forming a photosensitive resin film 38 having a rough surface 38a on the inner surface of the lower glass plate 32, and forming a metal reflecting film 39 of Al or the like over the rough surface 38a of the photosensitive resin film 38.

The surface of the metal reflecting film 39 is coated with an overcoating layer 40, and a color filter layer 41, a flattening layer 42, a transparent electrode layer 43 of ITO and an alignment layer 44 are superposed in that order on the surface of the overcoating layer 40. A transparent electrode layer 45 of ITO, a protective layer 46 and an alignment layer 47 are formed in that order on the inner surface of the upper glass substrate 31 Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A reflector fabricating method comprising the steps of:

coating a surface of a transparent substrate with a photosensitive resin film;

pressing a rough working surface of an embossing die against a part of the soft photosensitive resin film to form an embossed photosensitive resin part and, at the same time irradiating the embossed photosensitive resin part of the photosensitive resin film from behind a back surface of the transparent substrate for prehardening;

removing the embossing die from the prehardened, embossed photosensitive resin part having a desired embossed surface of the photosensitive resin film;

repeating those steps to form a plurality of prehardened, embossed photosensitive resin parts in the photosensitive resin film;

removing parts of the photosensitive resin film excluding the prehardened, embossed photosensitive resin parts of the same by etching;

heating the prehardened, embossed photosensitive resin parts of the photosensitive resin film for hardening; and forming a metal reflecting film over the hardened, embossed photosensitive resin parts of the photosensitive resin film.

* * * * *

UNITED STATES PATENT AND TRADEMARK OFFICE
CERTIFICATE OF CORRECTION

PATENT NO.    : 6,193,898 B1
DATED         : February 27, 2001
INVENTOR(S)   : Mitsuru Kano et al.

It is certified that error appears in the above-identified patent and that said Letters Patent is hereby corrected as shown below:

<u>Title page,</u>
Item [56], References Cited, in "FOREIGN PATENT DOCUMENTS", insert -- Hei -- before "7-198919".

Signed and Sealed this

Twenty-fifth Day of June, 2002

Attest:

Attesting Officer

JAMES E. ROGAN
*Director of the United States Patent and Trademark Office*